United States Patent [19]

Harford

[11] Patent Number: 5,446,500
[45] Date of Patent: Aug. 29, 1995

[54] NOISE REDUCING APPARATUS AND METHODS FOR TELEVISION RECEIVERS

[75] Inventor: Jack R. Harford, Flemington, N.J.

[73] Assignee: Samsung Electronics Co., Ltd., Suwon, Rep. of Korea

[21] Appl. No.: 330,949

[22] Filed: Oct. 28, 1994

Related U.S. Application Data

[62] Division of Ser. No. 897,812, Jun. 12, 1992, Pat. No. 5,369,445.

[51] Int. Cl.⁶ ............................................. H04N 5/213
[52] U.S. Cl. .................................. 348/618; 348/433; 348/493; 455/304
[58] Field of Search ................ 455/296, 304; 358/336, 358/314; 348/607, 616, 618, 533, 534, 493, 433, 475, 731; H04N 5/213

[56] References Cited

U.S. PATENT DOCUMENTS

| | | | |
|---|---|---|---|
| 4,090,221 | 5/1978 | Conner | 348/618 |
| 4,376,289 | 3/1983 | Reitmeier et al. | 348/616 |
| 5,075,774 | 7/1990 | Gibson et al. | 358/167 |
| 5,136,387 | 8/1992 | Mori et al. | 348/731 |
| 5,278,637 | 1/1994 | Naimpally | 348/493 |

*Primary Examiner*—James J. Groody
*Assistant Examiner*—Jeffrey S. Murrell
*Attorney, Agent, or Firm*—Allen LeRoy Limberg; Robert A. Westerlund; Stephen R. Whitt

[57] ABSTRACT

A high-performance television receiver synchronously detects the picture IF signal. A synchronous impulse noise in the IF signal generates either positive-going noise or negative-going noise in the video signal supplied from a synchronous video detector, which noise is subsequently replaced by a value of video signal occurring previous to the impulse noise in the following manner. The video signal contaminated with impulse noise is supplied as input signal both to an impulse noise detector and to a delay line. The output signal from the delay line, delayed by about 240 ns, is supplied as the signal for tracking by a track-and-hold circuit. The detected impulse noise signal is used to actuate the hold condition in the track-and-hold circuit. By stretching the pulse from the impulse noise detector for the 600–800 ns duration overlapping the duration of most impulse noise, the track-and-hold circuit replaces most impulse noise with previously stored values of the delayed video signal. This not only generally avoids the appearance of white impulse noise and ensuing black impulse noise in the televised picture, but avoids the application of impulse noise to the chroma channel receiving synchronously detected video signal as its input signal. Shock excitation of the chroma channel is accordingly avoided, so chroma "twinkle" does not appear in the televised picture.

21 Claims, 8 Drawing Sheets

NOISE REDUCING APPARATUS AND METHODS FOR TELEVISION RECEIVERS

This is a division of application Ser. No. 07/897,812, filed Jun. 12, 1992 now U.S. Pat. No. 5,369,445.

FIELD OF THE INVENTION

The present invention relates to television receivers in general and more particularly to a television receiver incorporating apparatus for suppressing impulse noise that would otherwise adversely affect picture quality.

BACKGROUND OF THE INVENTION

As is well known, television receivers are susceptible to signal interference from various noise sources. This interference may arise from many different sources which operate to interfere with the television signal or with the processing of the television signal by the television receiver. Typical sources of such interference are automotive ignition systems, household motors and various other forms of interference as well. The term impulse noise interference is commonly used to describe such events and can cause disruption to the automatic gain control (AGC) circuits, the synchronizing circuits, as well as the video and chroma signals. As is well known, if the impulse noise is present in the video detector output signal, that noise can proceed through the video processing path and result in a noise image being developed on the screen of the picture tube. The impulse noise will also be supplied to the sync processing path and cause the sync separator to generate unwanted output signals. Because the horizontal sync from the sync separator is usually supplied to an AGC system in the receiver, the latter system may be disrupted by the noise-induced output of the sync separator. As indicated, these problems are well known in the prior art.

AGC and sync circuits are limited-bandwidth systems and filtering has been used to render these circuits relatively immune to impulse noise. Video and chroma circuits cannot employ the filtering techniques that are used with the sync and AGC circuits because the impulse noise signals share the same frequency spectrum with the video and chroma signals. Accordingly, non-linear signal processing of some sort is often applied to such receivers, but this processing often is not very effective.

In U.S. Pat. No. 4,377,823 issued on Mar. 22, 1983 and entitled "Noise Processing System for a Television Receiver" Mycynek describes a television receiver with a video detector of envelope type which develops only black-going impulse noise, which black-going impulse noise is detected and inverted in the sync processing path. Mycynek further describes the black-going impulse noise in the video processing path being detected and replaced by a constant video level, preferably a 30 IRE gray level.

In U.S. Pat. No. 4,514,763 issued Apr. 30, 1985 and entitled "Sound Signal and Impulse Noise Detector for Television Receivers" Rindal describes a television receiver using a phase-lock loop for detecting the audio information from the television signal and for providing a control signal which, when applied to compensation circuitry, reduces impulse noise effects in the video information. Rindal refers to the problem of sorting impulse noise response from desired video signal and avoids this problem by detecting impulse noise, not as it accompanies video signal, but rather as it modulates the amplitude of the frequency-modulated sound carrier.

Impulse noise is a problem in other types of systems, such as AM radio, where the logarithmic characteristic of one's hearing response helps diminish the intrusiveness of impulse noise during listening. In regard to noise cancellation techniques in general, reference is made to the following U.S. patents which pertain to the general field of methods and techniques for cancelling impulse noise. In U.S. Pat. No. 4,272,846 issued Jun. 9, 1981 and entitled "Method for Cancelling Impulse Noise" Muratani et alii describe a method for cancelling impulse noise in a system where a band-limited baseband signal is transmitted through a channel that has a wider band than that of the baseband signal. In U.S. Pat. No. 4,810,101 issued Mar. 7, 1989 and entitled "Noise Detection by Sampling Digital Baseband Signal at Eye Openings" Kage et alii describe a noise detection circuit for a digital radio receiver wherein a signal is sampled at a particular time interval when a large noise pulse is generated. In U.S. Pat. No. 4,622,520 issued Nov. 11, 1986 and entitled "FM Demodulator With Impulse Noise Elimination Circuit" Kuroda describes apparatus for demodulating an FM signal in which apparatus impulse noise is eliminated by a noise elimination and detection circuit which appears before the filters. Other patents describe noise pulse suppressing systems for mobile communications radio receivers, such as U.S. Pat. No. 4,311,963 entitled "Noise Pulse Suppressing System" issued Jan. 19, 1982 to Watanabe et alii. U.S. Pat. Nos. 4,272,846 and 4,311,963 are of particular interest in that both disclose the general concept of detecting impulse noise in a signal, subsequently delaying that signal, and then responsive to the detection of the impulse noise cancelling the impulse noise in the delayed signal. U.S. Pat. No. 4,311,963 is also of particular interest for its disclosure of prior art use of track-and-hold circuitry in impulse noise cancellation schemes While there is ample evidence of a general awareness of noise cancellation and detection methods on the part of those skilled in the art, modern television receivers operate in various modes which introduce new problems of impulse noise detection. High-performance television receivers often employ synchronous picture (pix) intermediate frequency (IF) demodulators. Synchronous demodulation may be done in two phases: an in-phase synchronous demodulation that detects the composite video signal and the accompanying modulated sound carrier, and a quadrature-phase synchronous demodulation that detects the chrominance signal and modulated sound carrier without much accompanying luminance information. The only baseband components in the quadrature-phase synchronous demodulator response are differentiated transients of sync pulses and luma.

Unlike envelope or peak detectors which invariably detect the impulse noise as black-going in a negatively modulated video carrier such as that used in the NTSC and PAL television broadcast standards, synchronous detectors demodulate the asynchronous impulse noise as alternately black-going and white-going noise. White-going impulse noise is particularly objectionable since it tends to bloom the picture tube. The amplitude-modulated video carrier is vestigial sideband, so the pix IF amplifier chain filtering is centered about 2 MHz away from the video carrier frequency. Ringing of this filtering by impulse noise generates a random-phase damped sinusoid of about 2 MHz frequency, usually of large amplitude, in the in-phase synchronous demodulator response. If a quadrature-phase synchronous demodulator is used, a random-phase damped sinusoid of comparable frequency and amplitude is also generated in the quadrature-phase synchronous demodulator response.

In U.S. Pat. No. 4,524,389 issued Jun. 18, 1985 and entitled "Synchronous Video Detector Using Phase-Locked Loop" Isobe et alii describe a television receiver having just an in-phase synchronous demodulator. Black-going impulse noise in the output signal of this video detector is detected by a black noise detector and is thereafter cancelled to gray. The output signal of the black noise detector is supplied to a pulse-stretcher. The pulse stretcher output signal is used to control the cancellation to gray of white noise following the detected black noise. The Isobe et alii procedure has shortcomings. Likely as not, the initial signal swing of the synchronously detected impulse noise with significant energy will be white-going, rather than black-going. Each such a white-going initial swing undesirably causes an intense white spot in the picture. Collectively, these white spots are sometimes called "salt" noise in contradistinction to "pepper" noise, a term used to refer collectively to the black spots in the picture caused by inversion of impulse noises to black in a television receiver with a video detector of the envelope detector type. These white-going spikes in the video detector output signal also disrupt the chroma channel.

The inventor knows of previous techniques for suppressing white-going impulse noise in which the white-going impulse noise in the video detector output signal is sensed and subsequently replaced with black (or a prescribed gray) level to generate a modification of video detector response. The setting of the video noise inversion threshold in such systems is extremely critical. The depth of video modulation can vary considerably from one source to another; so, if the threshold for impulse noise detection is set too close to the white level, false tripping on high white level modulation will frequently occur. If there is a high chroma, due to standing waves or other antenna problems, the noise inverter will falsely trigger on the chroma signal. If the threshold level is too high, too much white-going impulse noise will get through and bloom the picture tube. The detected in-phase video signal generally changes to white before it is detected as white-going impulse noise, so the damage or interference to the picture is already apparent when action is instituted to suppress the white-going impulse noise in these previous techniques. Although the duty factor of the white-going impulse noise is reduced, the interference is still seen by a person viewing the televised picture.

As practiced in the prior art, the very act of noise inversion creates a high-slew-rate signal which propagates through the video and chroma channels of the television system or receiver. A black or gray streak is inserted in the video signal by noise inversion circuitry that responds to impulse noise to replace the noise with a prescribed video level, and this streak is readily evident on the screen when impulse noise occurs over an extended time. The chroma channel is shock excited by the large-amplitude, fast-rising noise inversion pulse; and the consequent ringing of the filters in the chroma channel causes chroma "twinkle". Chroma "twinkle" comprises color changes of short duration at the points in the television picture where impulse noise intermittently occurs. The color changes at each of which points reminds some viewers of the light emitted by a star, which is the reason the word "twinkle" is associated with this phenomenon.

The problem of the detected in-phase video signal changing to white before impulse noise is detected, so the damage or interference to the picture is already apparent when cancellation of impulse noise proceeds, is avoided in the invention by detecting the impulse noise as it occurs in a video detector output signal and effecting noise cancellation in a delayed response to that or another video detector output signal. The television picture is subsequently derived from the delayed video signal after the noise cancellation. If the impulse noise is detected in the video signal supplied by an in-phase synchronous demodulator and is detected in only one sense, black-going or white-going, it is preferable to detect white-going impulse noise. The video detector output signal can be delayed a shorter time before effecting noise cancellation, while still avoiding blooming on white-going noise, thereby reducing hardware cost.

The problem of chroma "twinkle" is addressed in the invention by using track-and-hold circuitry to effect noise cancellation in the delayed video detector output signal, thereby to avoid introducing a large-amplitude, fast-rising noise inversion pulse into that delayed signal, as would shock excite the chroma channel using that delayed signal for input signal. Effecting noise cancellation in a delayed response to video detector output signal in order to avoid white-spotting during the initial portions of impulse noise removes another source of shock excitation of the chroma channel using that delayed signal for input signal.

SUMMARY OF THE INVENTION

The invention is embodied in a principal one of its aspects in a television system including a source of an intermediate frequency (IF) signal comprising an IF picture carrier amplitude modulated with video information; a video detector for detecting said video information, which undesirably can be accompanied at times by detected impulse noise; and processing circuitry for providing an output video signal in response to said video information as detected by said video detector, in which output video signal response to said detected impulse noise is suppressed. The processing circuitry comprises noise detecting means for generating an output control signal responsive to the video information as detected by the video detector, the output control signal being indicative of whether or not an appreciable amount of detected impulse noise accompanies that detected video information; delay means for generating a delayed response to that detected video information; and video output means controlled by the output control signal, for responding to the current value of the delayed response to the detected video information when the output control signal indicates there is not an appreciable amount of detected impulse noise accompanying the detected video information, and for substituting the delayed response to the detected video information for its current value when the output control signal indicates there is an appreciable amount of detected impulse noise accompanying the detected video information.

The present invention is particularly suited to TV receivers of the type which employs two pix IF demodulators, a first synchronous demodulator to detect an in-phase video signal which is designated as the I video signal, and a second synchronous demodulator to detect a quadrature signal designated as the Q video signal. When standard NTSC television signals are being received by such a TV receiver, the quadrature channel by its very nature has no luminance component and therefore has no low-frequency component. Accordingly, the Q video signal can have a wider dynamic range available for the higher-frequency components in the video signal. This is especially true in TV receivers where the I and Q video detector responses are digitized by analog-to-digital conversion circuitry. Since there is no low-frequency component in the quadrature channel, impulse noise can be detected in both the positive- and negative-going directions using relatively low-amplitude threshold settings for noise detection. There is no need to use a relatively high-amplitude threshold setting in one direction so as to be able to be non-responsive to the synchronizing pulses, since the quadrature channel has negligible response to the synchronizing pulses.

In embodiments of the invention in which impulse noise is sensed primarily in the quadrature channel, the threshold of impulse noise detection can accordingly be set very close to the start of the impulse, both in amplitude and time. This is especially true in embodiments of the invention in which the impulse noise in the quadrature channel is sensed in both the positive- and negative-going directions. There is inherent immunity from lockout provided by sensing noise in the quadrature channel. So a noise-protected signal generated in response to the sensing of impulse noise primarily in the quadrature channel can be used also for generating automatic-gain-control (AGC) signals, thus reducing the circuitry required for protecting AGC from impulse noise.

DETAILED DESCRIPTION OF THE INVENTION

In prior-art television receivers of the ordinary type, the construction of the RF-IF stages for receiving a television signal and reproducing a video signal includes a tuner or RF amplifier for receiving, amplifying and converting a selected RF signal to a given IF signal frequency. The IF signal frequency is generated by superheterodyning the selected RF signal with a local oscillator frequency which is positioned above the selected RF signal frequency such that the frequencies resulting from the frequency conversion are 45.75 MHz for the picture carrier, 41.25 MHz for the sound carrier, and 42.17 MHz for the color subcarriers. The cascaded IF amplifiers amplify selected frequency components of the conversion result and then a video detector produces a video signal from the IF signal so selected and amplified. The receiver may include a video signal processing circuit and so on. It has been known to utilize synchronous video detectors which employ a phase-lock loop. The synchronous detection of a video IF signal is implemented with a synchronous carrier signal reproduced by a phase-lock loop which includes a voltage-controlled or current-controlled oscillator, either of which will for the sake of convenience be denominated a VCO in the remainder of this specification. For an example of a synchronous video detector circuit, reference is made to U.S. Pat. No. 4,524,389. A synchronous detector is a means of obtaining a vector product of a reference signal and a video signal. Synchronous detectors, while sometimes employed in the video portion of the television receiver as herein described, have been widely employed for deriving the color subcarrier signals.

Figure 1:
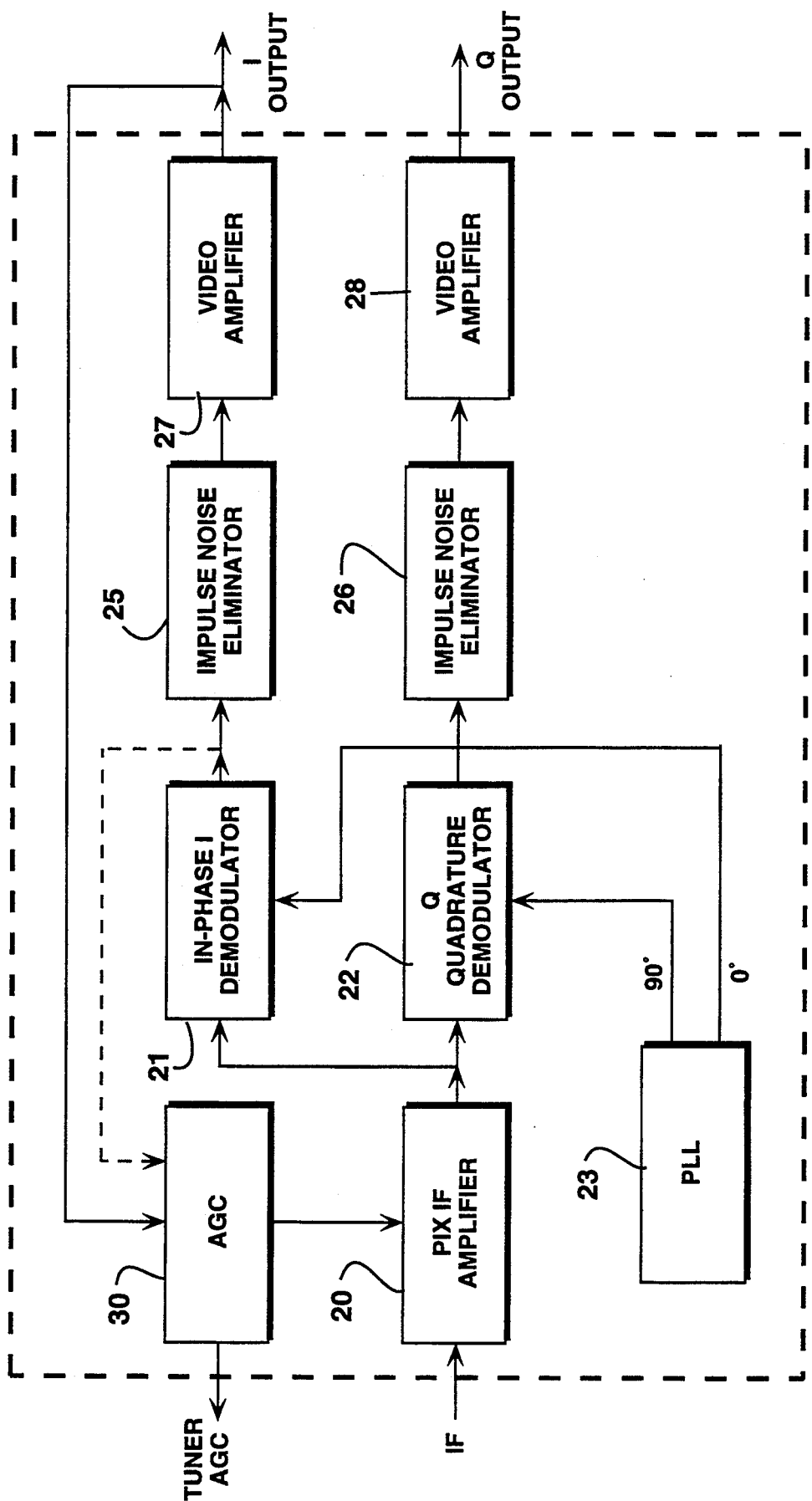
FIG. 1 is a simple block diagram showing an IF section of a television receiver employing synchronous IF demodulators with impulse noise eliminators according to this invention.

FIG. 1 is a block diagram of the IF portion of a television receiver which television receiver employs synchronous demodulation of the video-IF signal. The remainder of the television receiver has not been included because such receiver block diagrams are well known and further because many different techniques for processing of television signals are known in the art. Thus, as indicated above, a typical television receiver, such as a color receiver, contains an RF tuner, which may be a frequency-synthesis tuner, and further contains a typical IF processing circuit, and additional circuitry such as chroma circuitry, color matrix circuitry, as well as the color picture tube and associated drive devices. While the present invention is being described in conjunction with a high-performance television receiver employing synchronous IF demodulators, it is to be understood that this particular invention may be employed in other receiver ,system configurations as well.

Referring to FIG. 1 there is shown an IF amplifier designated as a pix IF amplifier 20. The amplifier 20 receives at an input the IF signal which is generated by a typical television receiver as the difference between the local oscillator frequency and the RF signal frequency. The IF frequency, as is well understood, is typically 45.75 MHz for the picture carrier and is at this fixed frequency for each channel or station that the television receiver is tuned to. Thee IF frequency signal may be selected by a surface-acoustic-wave (SAW) filter in modern television sets. The pix IF amplifier 20 and its pre-filter tend to exhibit ringing at a natural frequency responsive to impulse noise excitation. In a pix IF amplifier for a video carrier with vestigial AM the center frequency of the pix IF amplifier 20 and its pre-filter are typically at a 1.8 to 2 MHz remove from the picture carrier frequency; and detection of ringing at their natural, center frequency tends to produce a damped sinusoid of corresponding initial frequency, which is close to video midband.

The amplified IF signal emanating from the output of amplifier 20 is now applied to the inputs of an in-phase demodulator 21 and a quadrature demodulator 22. The demodulators, as 21 and 22, are Synchronous demodulators and operate accordingly. Each demodulator, as 21 and 22, receives a reference signal from the phase-lock loop 23 (PLL) which includes a VCO. In this manner the in-phase demodulator receives a reference oscillator frequency at a phase of 0° while the quadrature demodulator 22 receives a reference frequency at a 90° phase. The operation of the phase-lock loop 23 is well known, and the VCO provides a reference-frequency corresponding to the picture carrier frequency of 45.75 MHz.

Thus, the in-phase demodulator (I) 21 and the quadrature demodulator (Q) 22 synchronously demodulate at 0° and 90° phases respectively of the IF carrier frequency, to produce at their respective outputs an I video signal and a Q video signal. Each signal, at the output Of the respective demodulator may contain noise which may be ignition noise or noise which is randomly injected into the television receiver from various sources and designated as impulse noise. FIG. 1 shows the output of the I demodulator 21 coupled to the input of an impulse noise eliminator 25. The function of the impulse noise eliminator 25 is to eliminate impulse noise which is contained at the output of the I demodulator. The output of the impulse noise eliminator provides a video signal which is relatively noise-free and which is supplied to the video amplifier 17 which provides an output designated as I output.

In a similar manner, the output of the quadrature demodulator (Q) 22 is applied to the input of an impulse noise eliminator 26, which can have the same circuit configuration as the impulse noise eliminator 25. The output of the impulse noise eliminator 26 is applied to the input of a video amplifier 28 which provides an output Q video signal that is noise-free.

FIG. 1 shows in solid connection an AGC circuit 30 arranged to receive from the output of amplifier 27 I video signal with impulse noise removed therefrom. Alternatively, as FIG. 1 shows in dashed connection, the AGC circuit 30 can receive from the output of demodulator 21 the I video signal with impulse noise intact, with low-pass filtering within the AGC circuit 30 being used to select against impulse noise. AGC operation is well known.

Figure 2:
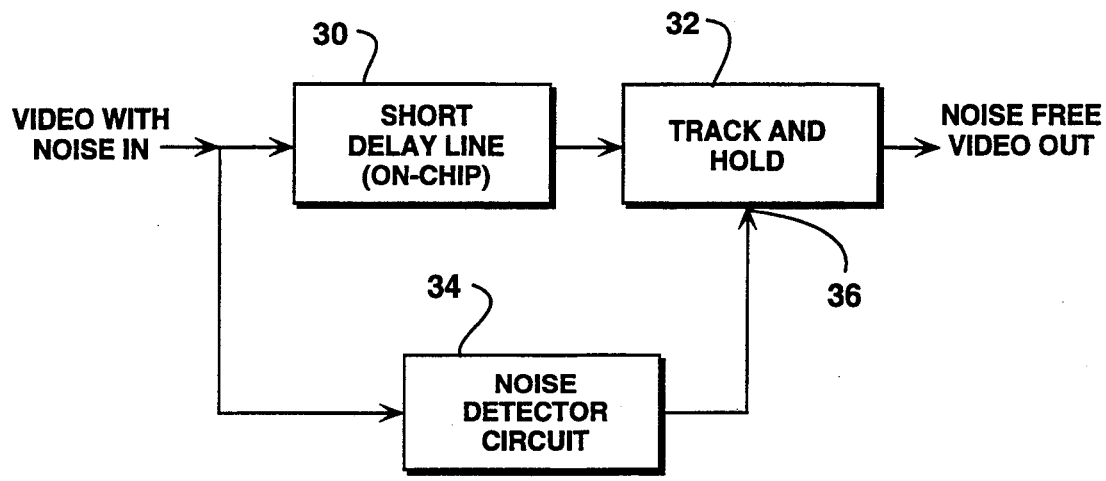
FIG. 2 is a simple block diagram showing an example of a noise eliminator circuit according to this invention.

Referring to FIG. 2, there is shown a simple impulse noise eliminator which can be used for the module 25 of FIG. 1. The in-phase (I) video signal with noise detected by the I demodulator 21 is applied to the input of a delay line 30 which can be fabricated on the same integrated circuit chip as the demodulator. The delay line 30 provides a delay of about 240 ns to the video signal which is applied to the input of the delay line. Impulse noise is randomly occurring and can be demodulated in either positive-going and negative-going directions by the I demodulator 21 and by the Q demodulator 22. That is, impulse noise can be demodulated the black-going and white-going video signal directions by the I demodulator 21. One cannot prospectively determine whether the video noise will initially be black-going or initially be white-going. Therefore, if one threshold detects the noise in only one polarity sense, at times a full half cycle or somewhat more of IF ringing can occur before threshold detection takes place. White-going impulse noise is extremely objectionable as it causes the picture to bloom. Impulse noise accompanying the RF input signal to the television receiver generates white-going noise pulses in the detected video signal that swing whiter than white.

The delay line 30 enables the detection of white-going noise pulses by the noise detector 34 to be made most of the time in advance of the time the correction has to be made to the delayed video signal at the output of the delay line 30. Its 240 ns delay extends over almost a half cycle of the 2 MHz or so natural ringing frequency of the IF amplifier and its pre-filter. The track-and-hold circuit 32 is actuated by the impulse noise detector 34 so as to hold a value of the delayed video signal that occurs before the transition towards white that will subsequently occur in the delayed video signal. Accordingly, the track-and-hold circuit 32 avoids any precursory white spot in the video signal before a constant value of video is substituted for the impulse noise. Any black-going impulse noise in the detected video signal that precedes white-going impulse noise subsequently generated by ringing in the pix IF amplifier chain is similarly diminished in the output signal of the track-and-hold circuit 32, by the substitution of ,the constant value of video anticipatory of white-going impulse noise in the delayed video signal. Using a delay line to permit, the detection of noise pulses in advance of the time the correction has to be made to the delayed video signal at the output of the delay line is, the inventor points out, generally a useful procedure in any of the schemes which substitute a constant video level for the portions of the delayed video signal accompanied by impulse noise. These schemes include the substitution of a prescribed gray level for impulse noise, the substitution of pixels one scan line back for impulse noise, etc.

Adding another stage to the delay line 30 to extend its delay to about 320 ns will enable, the detection of white-going noise pulses by the noise detector 34 to be in advance of the time the correction has to be made to the delayed video signal at the output of the delay line 30 nearly all of the time, but the cost of the extra stage is believed to be unjustified by the marginal increase in performance. The detection of white-going noise pulses in more than one phase and ORing the results of the detections can also be done to cut down the likelihood of impulse noise not being detected within 240 ns.

Track-and-hold circuits such as 32 are, of themselves, well known. The circuit 32 has an input which receives the delayed video from the delay line 30 and amplifies or passes this signal at the output (NOISE-FREE VIDEO). The track-and-hold circuit 32 has a control terminal 36 coupled to the output of the noise detector circuit 34. When a pulse or control signal is applied to terminal 36, the track-and-hold circuit 32 enters the hold state and the previously stored value of the video signal is substituted for current impulse noise in the signal supplied from the NOISE-FREE VIDEO output terminal. Essentially, a track-and-hold circuit may include a first amplifier or isolation stage having an output selectively applied via a FET switch or other switch device to a storage element such as a capacitor. The switch and capacitor are connected to the input of an output amplifier or other device. When the switch is closed, the input signal propagates to the output. When the switch is opened by a control pulse, the charge on the Capacitor, which may be the signal value prior to the switch opening, is applied to the output. Such circuits are well known. See a text entitled "Guidebook of Electronic Circuits" by J. Markus, McGraw-Hill Book Co., Chapter 99 entitled "Sampling Circuits". The term "track-and-hold" is used herein and in the claims to define the function of replacing the video signal value with a stored or constant value during the detection of a noise pulse. The noise detector circuit 34, as will be explained, contains a threshold Circuit that operates to detect white-going signal above a given threshold, which white-going signal is presumably caused by impulse noise.

Thus, the delay line 30 is used to delay the input video signal. The impulse noise signal Which may be impressed upon the video signal is detected by the noise detector circuit 34, and the output of the noise detector 34 is then used to actuate holding by the track-and-hold circuit 32. The track-and-hold circuit 32 holds the value of the input video signal applied via the delay line just prior to the onset of the impulse noise.

The FIG. 2 noise eliminator circuit as thusfar described is satisfactory for cancelling white-going impulse noise in the in-phase (I) video signal. Where the impulse noise appears as alternating white-going and black-going noise swings —owing to ringing of the pix IF amplifier chain, for example—the less obtrusive black-going impulse noise may appear in some measure in the picture unless further noise-elimination measures are taken. The black-going impulse noise can be eliminated by modifying the noise detector circuit 34 to make it also respond to black-going signal that swings past black level, to actuate holding by the track-and-hold circuit 32 for both white-going and black-going impulse noise.

A FIG. 2 noise eliminator circuit having a noise detector circuit 34 that responds both to positive-going and negative-going swings outside a prescribed range for normal signals, as caused by impulse noise is suitable for the module 26 of FIG. 1. A FIG. 2 noise eliminator circuit having a noise detector circuit 34 that responds only to swings outside a prescribed range for normal signals which swings are in one direction is less suitable for the module 26 of FIG. 1. Swings outside the prescribed range for normal signals in the opposite direction may not be suppressed in the output signal of the track-and-hold circuit 32 as completely as one would prefer, although the short delay provided by line 30 aids in providing at least partial reduction.

Figure 3:
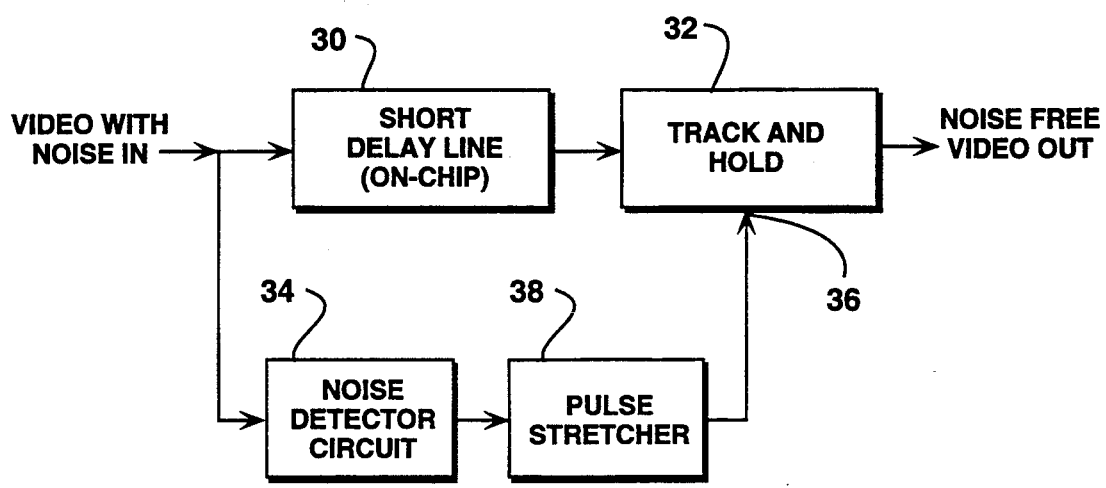
FIG. 3 is a block diagram of a modified FIG. 2 noise eliminator circuit that is an alternative embodiment of this invention.

FIG. 3 shows a modified form of the FIG. 2 noise eliminator circuit which can be used for either of the modules 25 and 26 of FIG. 1. A pulse stretcher 38 is inserted after the noise detector 34, to stretch the duration of the pulse used to actuate the track-and-hold circuit 32 by an amount which is statistically determined to overlap the duration (about 600 to 800 ns) of the swings with significant energy in the damped sinusoid that remain in the ringing of the IF amplifier and its preceding filter in response to any typical impulse noise, after the threshold of detection is no longer exceeded in the noise detector 34. Any reverse swing in the ringing of the IF amplifier and its preceding filter that has significant energy and drops below the threshold of detection in the noise detector 34 causes no corresponding cessation of the pulse output from the pulse stretcher 38 because the next swing (which is presumed still to have significant energy) again drives the noise detector 34 above the threshold of detection within the period of pulse stretch, which is significantly longer than a half cycle of the natural ringing frequency of the IF amplifier and its preceding filter. The pulse stretching provided by the pulse stretcher 38 is longer than one cycle of the natural ringing frequency, but is best kept no longer than two or three cycles of the natural ringing frequency in order to avoid too much loss of valid video information. Any ringing of the IF amplifier and its preceding filter having significant energy is completely cut out of the response of the track-and-hold circuit 32 and a constant video level is substituted therefor. Since the video level is constant and continues from a preceding value of video signal, no disturbance of substantial energy is present in the noise-free video from the track-and-hold circuit 32. Any initial black-going disturbance that might take place prior to white-going impulse noise detection has limited energy. There is also limited energy in any step occurring in the track-and-hold circuit 32 output signal when going from a held video value to a tracking video value.

Since the noise-free video from the track-and-hold circuit 32 contains no disturbance of substantial energy in response to impulse noise, there is no occurrence of shock excitation of the chroma channel in response to impulse noise, the chroma signal conventionally being derived from the I video signal or alternatively being derived from the Q video signal. This avoidance of shock excitation of the chroma channel eliminates the above-noted problem of chroma "twinkle", that afflicted prior-art television receivers using synchronous video detectors and separating chroma from the composite video signal recovered by in-phase synchronous detectors.

Figure 4:
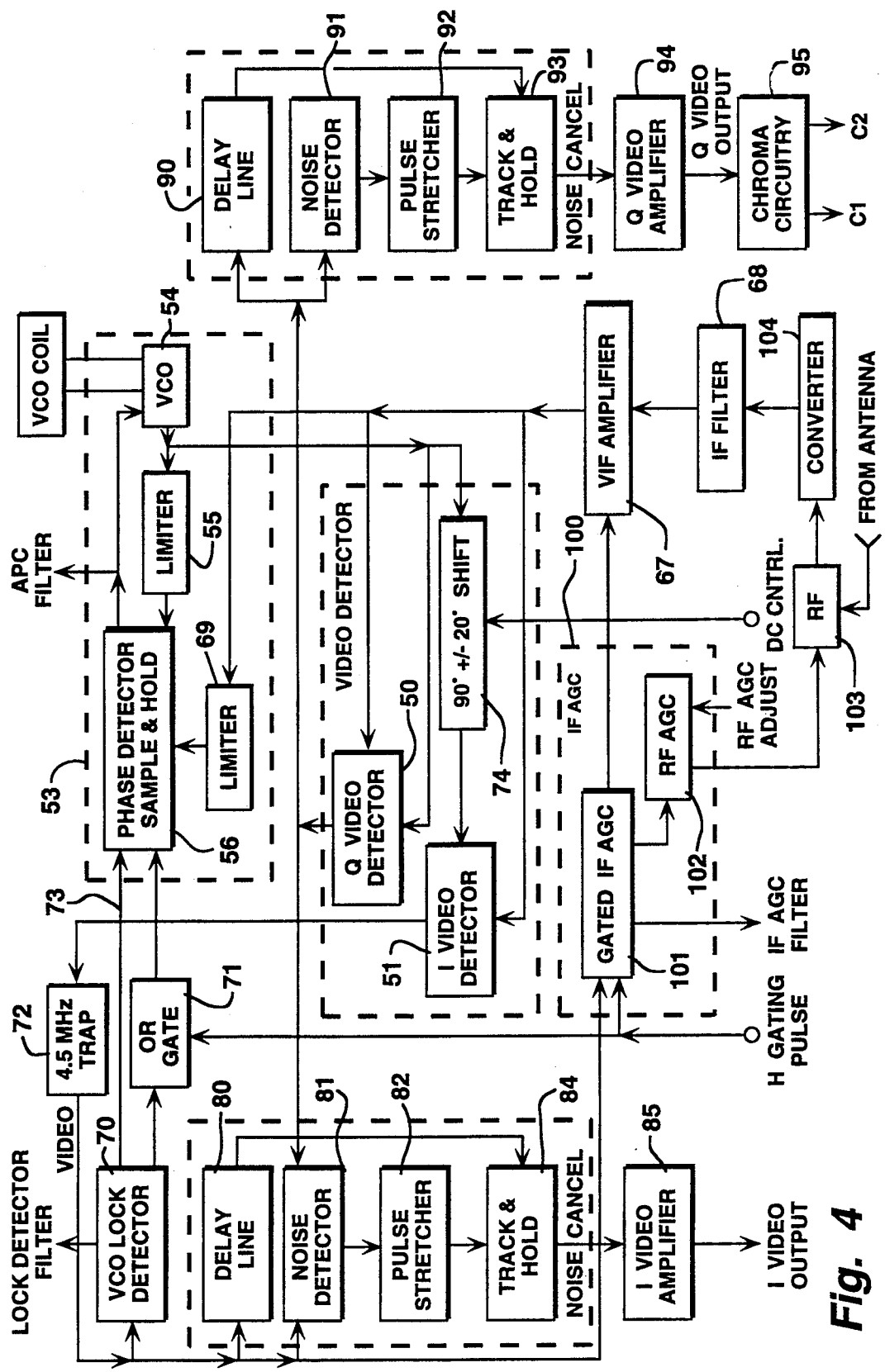
FIG. 4 is a detailed block diagram of a synchronous IF demodulation apparatus for providing an I video signal and a Q video signal, which apparatus employs noise elimination modules for both the in-phase and quadrature phase video signals.

FIG. 4 is a more detailed block diagram of an IF module incorporated in a television receiver which uses two video IF demodulators designated as Q video detector 50 and the I video detector 51. Each of the video detectors (or video demodulators) 50 and 51 receives a reference input signal from a phase-lock loop 53 containing a VCO 54, which VCO operates at a frequency of 45.75 MHz. The output of the VCO is supplied to a limiter 55, which supplies its output signal to a phase detector 56 of sample-and-hold type. Tile phase-lock loop 53 also receives an IF signal from the video IF (VIF) amplifier 67. The VIF amplifier 67 receives an IF input signal from the pix IF filter 68 which by way of example can comprise a SAW filter. The IF signal from amplifier 67 is applied to a second limiter 69 contained within the phase-lock loop and having an output coupled to the phase detector 56, which compares the phase of the VCO signal with the IF phase to generate an error signal at the output of the phase detector 56.

The error signal is applied to the VCO 54 to lock the VCO at the desired frequency. The operation of a phase-lock loop, such as 53, is well known.

FIG. 4 shows a VCO lock detector 70 that responds to the output signal of the I video detector 51 to determine when the VCO 54 is locked to the pix IF frequency. A sample-and-hold circuit for error signal that is included in the phase detector 56 samples error signal when the output signal of an OR gate 71 is high and holds when the output signal of the OR gate 71 is low. When the VCO is not in lock, causing the signal the VCO lock detector 70 supplies to the OR gate 71 to be high, the sample-and-hold circuit is maintained in its sampling state and the phase detector 56 generates error signal on a continuous basis, which helps condition the VCO 54 to exhibit a broadened pull-in range. When the VCO 54 is in lock, there is no longer need for a wide pull-in range, since only hold-in range is then of concern. The signal the VCO lock detector 70 supplies to the OR gate 71 becomes low, and the sample-and-hold circuit samples only during horizontal (H) gating pulses, the holding between these pulses conditioning the VCO 54 to exhibit the improved noise immunity associated with a narrowed pull-in range. Typically, the VCO lock detector 70 supplies to the phase detector 56 via a connection 73 an analog signal indicative of the degree of closeness to lock. This analog signal is used in the phase detector 56 to ease the transitions associated with switching from pull-in to lock-in modes in the phase lock loop and to make other adjustments to the phase detector for modifying its bandwidth when going from one mode to the other. Such locking detection features have been employed in prior art. U.S. Pat. No. 4,524,389 describes a lock detector in conjunction with the synchronous video detector.

The Q video detector 50 and the I video detector 51 both receive IF signals from the video-intermediate-frequency (VIF) amplifier 67. The Q video detector receives the VCO signal from VCO 54 at 90° phase while the I video detector receives the VCO signal 54 at a 0° phase. The 0° phase is implemented and controlled by a phase shifter 74 which is DC-controlled to exhibit a phase shift of 90° which can be varied by varying the DC applied thereto. DC-controlled phase shifters such as 74 are well known in the art. An I video signal emanating from the module 50 includes the modulated chrominance subcarrier as a component of the composite video signal also including the luminance signal as a component. A Q video signal emanating from the module 51 contains the modulated chrominance subcarrier essentially free of any accompanying luminance component.

Each of these I and Q video signals is applied to the input of an associated impulse noise eliminator or noise canceller. The output of the I video detector 51 is applied to the input of a 4.5 MHz trap 72 for the frequency-modulated sound carrier. The output of trap 72 is applied to the input of the VCO lock detector 70 and is applied to the input of delay line 80 and noise detector 81. These are analogous to the delay line 30 and noise detector 34 of FIG. 3. The noise detector 81 can also receive the Q video signal which is the output from the video detector 50. The delay line 80 and the noise detector 81 operate in conjunction with the pulse stretcher 82 and the track-and-hold circuit 84, as described above, to produce the noise-free video signal at the output of the track-and-hold circuit 84 which, in this case, in now applied to a conventional video amplifier 85. Amplifier 85 produces a first output signal designated as I VIDEO OUTPUT.

FIG. 4 shows the output of the Q video detector 50 applied to a separate noise eliminator circuit which includes delay line 90, noise detector 91, pulse stretcher 92 and a track-and-hold circuit 93. The output from the track-and-hold circuit 93 is applied to the Q video amplifier 94 which has an output for supplying a signal designated as Q VIDEO OUTPUT. Another input to the noise detector 91 may be applied from the output of the I video detector 51, as shown in FIG. 4.

Modern receivers which may incorporate different processing techniques based on new television standards, may have the ability to utilize both an I video signal and a Q video signal in ways not described herein. These I and Q video signals can be used independently or jointly as desired and, except as particularly described in this specification, the subsequent uses are not part of this invention.

The chroma signal can be derived either from the I video information as is done in conventional receivers or from the Q video information as shown in FIG. 4. In either case the inversion of a noise pulse to a fixed baseline video level, similar to what has been done in the prior art, would tend to shock excite the chroma channel, giving rise to undesired chroma "twinkle". The substitution of a previous value of video information for the current value of video information during impulse noise conditions in accordance with the invention greatly reduces the energy that a noise pulse introduces into the chroma channel and avoids undesired chroma "twinkle". The derivation of chroma signal from the Q video information is particularly advantageous. Since there is no luminance component in the Q video information, there is less likelihood that the substitution of a previous value of video information will be followed by any shock excitement of the chroma channel when returning to current video information which may exhibit a change from previous video information. Accordingly, FIG. 4 shows this preferred arrangement in which chroma circuitry 95 responds to the Q VIDEO OUT signal supplied to it from the Q video amplifier 94 to generate first and second color difference signals.

The frequency-selective filtering of the chroma signal suppresses the first and third harmonics of IF amplifier ringing that may persist in reduced degree when returning to current video information. The frequency-selective filtering of chroma signal before amplification or digitization thereof also minimizes the dynamic range of the chroma signal before such amplification or digitization.

FIG. 4 shows an AGO circuit 100 where a gated IF AGC module 101 receives an output from the I video detector after passing through the 4.5 MHz trap 72 and also receives the horizontal gating pulse to produce an output signal which is indicative of the magnitude of the video signal. The AGC circuit 101 produces a gain control signal for the VIF amplifier 67. The AGC circuit 101 supplies a gain control signal to the RF AGC circuit 102 which responds to supply delayed AGC signal to the RF amplifier 103. The RF AGC circuit 102 also contains RF AGC adjustment circuitry. Such gain controls for IF and RF are well-known in the television art and are not considered to be part of this invention.

While FIG. 4 shows noise elimination or suppression for both the I and Q video channels, in alternative embodiments of the invention noise suppression is provided for only one of these channels. FIG. 4 shows the RF amplifier 103, which is supplied RF input signal from a typical television antenna or cable, connected to supply amplified RF signal to a converter 104. The converter 104 Supplies IF signal to the pix IF filter 68, which suppresses image frequencies and out-of-band noise. Color matrixing, color amplifiers, sound circuits, deflection circuits and so on associated with a television receiver, are for purposes of simplicity not shown in FIG. 4.

In any event, one skilled in the art of television receiver design understands that there are many different IF circuits for the separation of sound information from TV signals and for their amplification. These are referred to as intercarrier, split carrier and quasi-parallel. In high-quality TV receivers of the type which employ synchronous detection of video, the current preference is to use a separate combined video-sound IF section especially tuned for implementing intercarrier sound operation, which is additional to the video IF amplier 67 that provides video IF signals to the Q video detector 50 and the I video detector 51. The video IF amplifier 67 and preceding filter 68 can then be arranged for overall linear-phase response, with some attenuation of sound carrier. The separate combined video-sound IF section can be tuned for a saddle response with peaks near the picture and sound carriers, to maximize intercarrier sound recovery and to lessen the likelihood of video interference with sound. In the intercarrier system both the picture and sound carriers of a desired channel, as respectively translated to 45.75 and 41.25 MHz intermediate frequencies, are amplified in the combined video-sound IF section. The two translated carriers are then mixed in a detector and a resulting difference of 4.5 MHz appears at the detector output. This signal contains the sound carrier FM modulation which can be further amplified, amplitude-limited and demodulated by a conventional FM demodulator circuit. The intercarrier sound system has two well-known advantages. First, tuning of the receiver is not critical, since the 4.5 MHz relationship is controlled accurately in a transmitted signal. Second, when using a video detector of peak or envelope type the intercarrier sound system has a lower cost than other techniques.

FIGS. 5, 6, 7 and 10 are detailed circuit schematics with the values of all circuit components specified. Thus, as one will understand, the conductivity of the transistors as being NPN or PNP transistors is shown. Resistor and capacitor values are also given with all capacitor values given in picofarads and values of resistance given in ohms or kilohms (K). A 7 v power supply provides operating potential to the circuitry of FIGS. 5, 6, 7 and 10.

Figure 5:
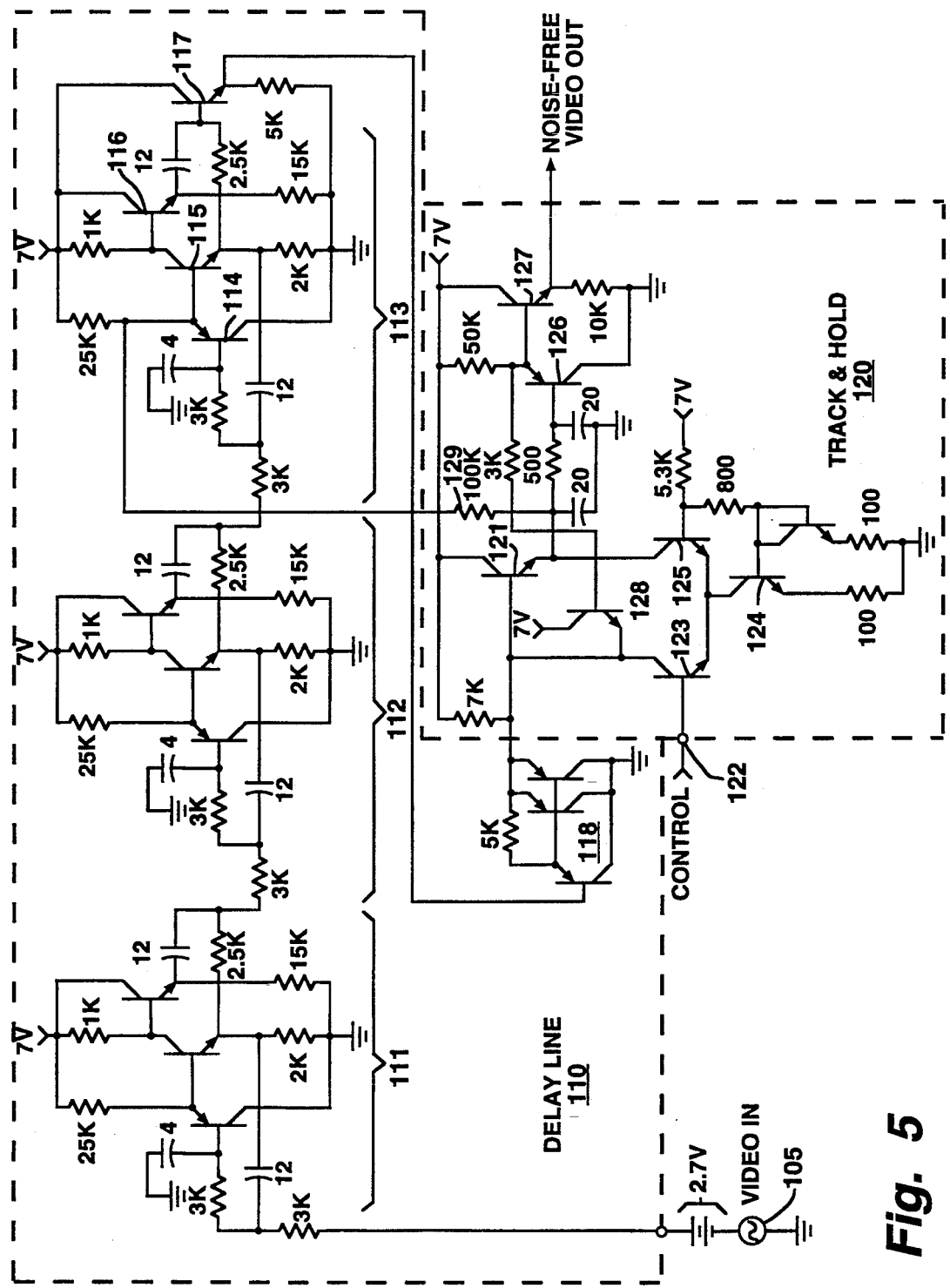
FIG. 5 is a detailed circuit diagram of a cascade connection of a delay line followed by a track-and-hold circuit, as may be used in a noise eliminator circuit according to this invention.

FIG. 5 is a detailed circuit schematic of the cascade connection of a delay line followed by a track-and-hold circuit, as may be used in a noise eliminator circuit per FIG. 2, 3, 8 or 9. The input video signal VIDEO IN is depicted as being supplied by a generator 105 in series with a 2.7 v battery, which together represent the inphase video detector 21 or the quadrature-phase video detector 22 and suitable DC-level shifting circuitry, if needed. That is, the input video signal may be either the I or Q signal. As will be described further on (in connection with the descriptions of FIGS, 6, 7 and 10) the generator 105 output is direct-coupled to an input of an impulse noise detector, which is the reason for its being biased.

FIG. 5 shows the VIDEO IN signal from the generator 105 after being biased being supplied to the cascaded first stage 111, second stage 112 and third stage 113 of a three stage active RC delay line 110 The stages 111, 112 and 113 are structurally similar to each other. The last stage 113 includes a PNP transistor 114 connected as a common-collector amplifier, an NPN transistor 115 connected as a base-driven phase-splitter amplifier, and an NPN transistor 116 connected as a common-collector amplifier. Each of the stages 111, 112 and 113 has a respective resistance-capacitance (RC) network associated therewith, where the values of the resistors and capacitors are given on the schematic of FIG. 5. The RC networks provide equal delays for the three stages With the delays accumulating to provide a 240 ns delay. It is understood that another stage can be added to the cascade to achieve a 320 ns delay or that delay circuits of another type with individual-stage delay that may differ from 80 ns can be utilized. The penultimate stage for the delay line 110 includes an NPN transistor 117 connected as a common-collector amplifier, and the output stage for the delay line is a PNP Darlington voltage-follower 118.

A track-and-hold circuit 120 having an input at the base electrode of an NPN transistor 121 is driven by the delay line output signal, supplied at low source impedance from the Darlington voltage-follower 118. The track-and-hold circuit 120 is conditioned to track the voltage applied to the base electrode of NPN transistor 121 as long as the voltage applied to a control terminal 122 thereof is sufficiently low. The base voltage of an NPN transistor 123 then being low, it does not divert to its emitter-collector path the collector current of another NPN transistor 124, the base-emitter circuit of which transistor 124 is biased for causing it to function as a constant-current sink. The constant current demand of the transistor 124 is instead satisfied from the emitter of an NPN transistor 125 biased at its base to a potential higher than that supplied to the terminal 122 when the CONTROL voltage is low. Transistor 125 responds to the demand for emitter current therefrom to demand a similar value collector current from the emitter of the transistor 121, conditioning transistor 121 to function as an emitter follower. The low-source-impedance emitter-follower action of transistor 121 charges and discharges the Shunt capacitors thereafter so that the signal at the base of a PNP transistor 126 connected as a common-collector amplifier follows the signal at the base of the NPN transistor 121 with a 0.75 v or so base-emitter voltage offset therefrom. The PNP transistor 126 connected as a common-collector amplifier drives the base of an NPN transistor 127 also connected as a common-collector amplifier, from the base of which is supplied a NOISE-FREE VIDEO OUT signal following the voltage applied to the base of transistor 126.

When the voltage applied to the control terminal 122 is sufficiently high, on the other hand, the track-and-hold circuit 120 is conditioned to hold a voltage previously applied to the base electrode of the NPN transistor 121. When the voltage applied to the control terminal 122 is sufficiently high, transistor 123 is caused to conduct. When transistor 123 conducts, its emitter follower action reverse-biases the emitter base junction of transistor 125, so the entire constant current demand of the transistor 124 is satisfied by emitter current drawn from the transistor 123. The transistor 123 demands a collector current like the emitter current withdrawn therefrom, which collector current demand increases the potential drop across the 7K$\Omega$ resistor to reduce to zero the forward bias on the emitter-base junctions of the output transistors in the Darlington voltage follower 118 and on the base-emitter junction of the transistor 121. The transistor 121 is no longer conductive to charge the 20 pf capacitors in its emitter circuit. Further, the reverse-biasing of the emitter-base junction of the transistor 125 cuts off its collector current demand, so there is no longer a low-resistance path for discharge current to flow from the 20 pf capacitors and the voltages on these capacitors is held and supplied by the combined emitter-follower actions of transistors 126 and 127 as NOISE-FREE VIDEO OUT signal.

The voltage one-base-emitter-offset higher at the emitter of the PNP transistor 126 is applied to the base of an NPN transistor 128, so its emitter clamps to a voltage substantially equal to that held on the 20 pf capacitors. This prevents the emitter-base junctions of the output transistors in the PNP Darlington voltage follower 118 and the base-emitter junction of the NPN transistor 121 being pulled into substantial reverse-bias, so that these devices can recover conduction quickly when next the voltage applied to the control terminal 122 is lowered. Thus, when the voltage applied to the control terminal 122 is high, the track-and-hold no longer passes the current delayed video level, but the charge on the 20 pf capacitors holds the delayed video level that obtained just prior to the detection of the white impulse noise for the duration of the stretched pulse applied to the control terminal 122. Thus, the track-and-hold circuit normally will directly pass a delayed video signal when no noise is present. When noise occurs, the output is a constant value derived from a preceding value of the delayed video signal.

There is a feedback resistor 129 from the emitter electrode of transistor 121 to the base electrode of transistor 115 included in the last stage 113 of the delay line 110. The resistor 129 prevents "lockout" so that the video output signal at the emitter electrode of transistor 127 is continuous and can be used for AGC.

Figure 6:
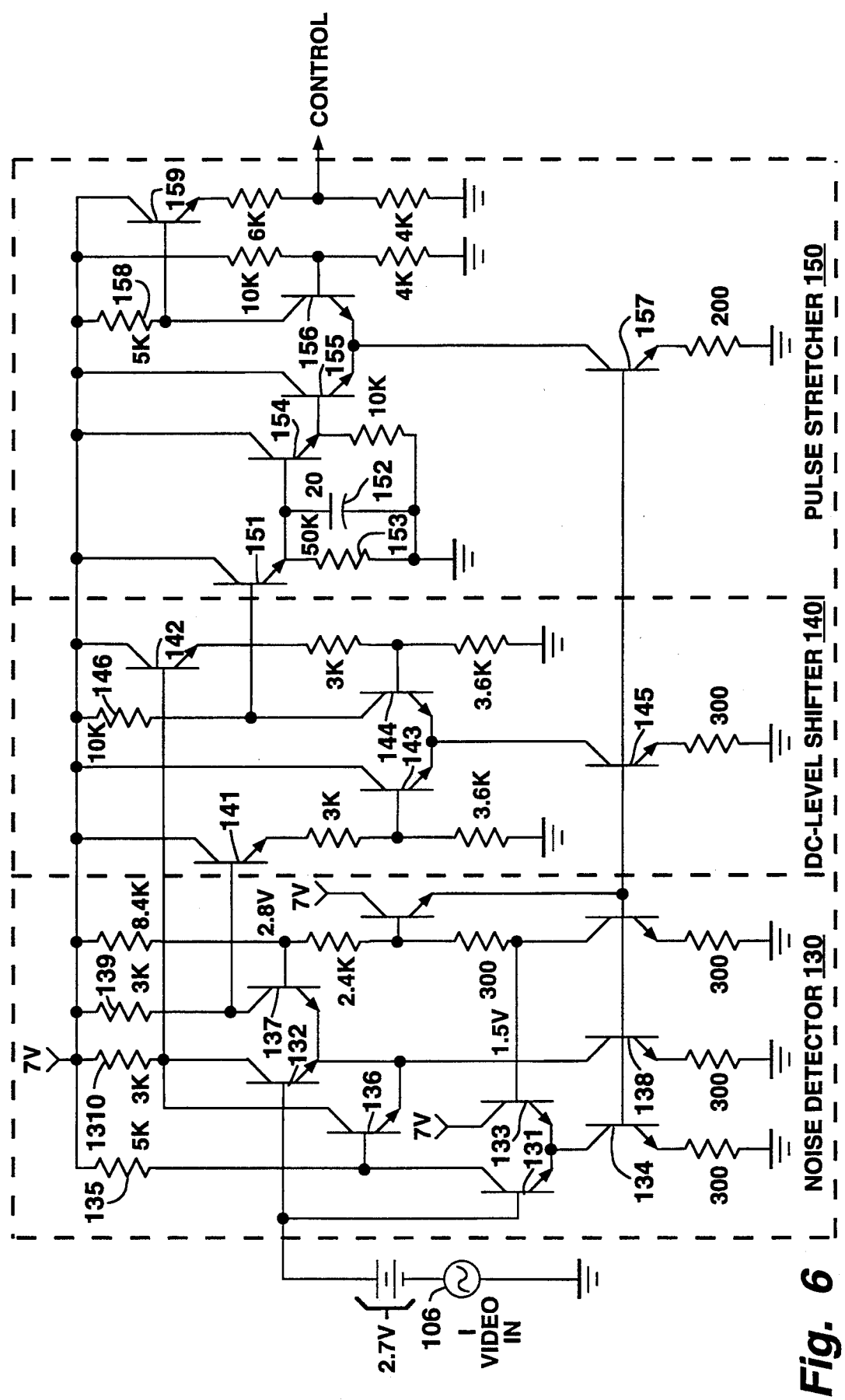
FIG. 6 is a detailed circuit diagram of a cascade connection of a noise detector, DC-level shifter and pulse stretcher, as may be used in a noise eliminator circuit connected after an in-phase synchronous video demodulator in accordance with this invention.

FIG. 6 is a detailed circuit diagram of a cascade connection of a noise detector 130, a DC-level shifter 140 and a pulse stretcher 150, as may be used in a noise eliminator circuit that is connected after an in-phase synchronous video demodulator 21 and that further includes a cascade connection of a delay line followed by a track-and-hold circuit per FIG. 5. An in-phase (I) VIDEO IN signal from a signal source 106 is biased to 2.7 v zero-carrier level (thus, to represent in equivalent-circuit form the video demodulator 21) and applied to the base electrodes of NPN transistors 131 and 132 in the noise detector 130. As long as the I VIDEO IN signal is unaccompanied by impulse noise, the base voltage of NPN transistors 131 and 132 is within a range between 1.5 and 2.8 volts. Since the base voltage of NPN transistor 131 is higher than the 1.5 v base bias of an NPN transistor 133 with which it has an emitter-to-emitter connection at a node from which a constant collector current is demanded by an NPN transistor 134, NPN transistor 131 supplies the current demand via its own emitter and demands a similar-value collector current flow through its collector load resistor 135. The resulting voltage drop across the resistor 135 reverse-biases the base-emitter junction of an NPN transistor 136.

The emitters of the NPN transistors 132 and 136 share a common connection with the emitter of another NPN transistor 137 having its base biased at 2.8 volts, from which common connection a constant collector current is demanded by an NPN transistor 138. As long as the base voltages of NPN transistors 132 and 136 are less than 2.8 volts their base-emitter junctions are reverse-biased by the emitter-follower action of the NPN transistor 137, which diverts to itself the entire collector current demand of the NPN transistor 138. The emitter current flowing from the NPN transistor 137 to meet the collector current demand of the NPN transistor 138 causes the NPN transistor 137 to demand a similar collector current flow, which flow gives rise to a voltage drop across the collector load resistor 139 of the NPN transistor 137. Since there is no current flow through the transistors 132 and 136, there is no voltage drop across the collector load resistor 1310 they share.

When impulse noise is detected by the noise detector 130, however, there is no collector current demand from the transistor 137 and consequently no voltage drop across its collector load resistor 139. If the impulse noise is white-going, swinging more positive than 2.8 volts, the base-emitter junction of transistor 137 is reverse-biased by the emitter-follower action of the transistor 132, which diverts to itself the entire collector current demand of the transistor 138. The emitter current flowing from the transistor 132 to meet the collector current demand of the transistor 138 causes the transistor 132 to demand a similar collector current flow, which flow gives rise to a voltage drop across the collector load resistor 1310 the transistor 132 shares with the transistor 136.

If the impulse noise is black-going swinging less positive than 1.5 volts, the base-emitter junction of the transistor 131 is reverse-biased by the emitter-follower action of the transistor 133, which diverts to itself the entire collector current demand of the transistor 134. The resulting lack of collector current demand by the transistor 131 causes there to be no voltage drop across its collector load resistor 135, and the base-emitter junction of the transistor 136 is accordingly forward-biased. The base-emitter junction of transistor 137 is reverse-biased by the emitter-follower action of the transistor 136, which diverts to itself the entire collector current demand of the transistor 138. The emitter current flowing from the transistor 136 to meet the collector current demand of the transistor 138 causes the transistor 136 to demand a similar collector current flow, which flow gives rise to a voltage drop across the collector load resistor 1310 the transistor 136 shares with the transistor 132.

A DC-level shifter 140 includes NPN emitter-follower transistors 141 and 142 with respective resistive voltage dividers in their emitter circuits for translating the voltages at the collector of transistor 137 and at the collectors of transistors 132 and 136 closer to ground for application to the base electrodes of the NPN transistors 143 and 144 connected as a long-tailed pair with tail current drawn from their joined emitters to the collector of an NPN transistor 145 biased to demand constant collector current. The emitter-coupled differential-input amplifier action of the NPN transistors 143 and 144 converts the push-pull voltage drive at their respective bases to a single-ended noise-detector output signal across a collector load resistor 146 of the transistor 144. This signal is normally only about 2 volts above ground, but rises to the 7 v operating potential when impulse noise is detected. When impulse noise is detected, the transistor 143 supplies the entire collector current demand of the transistor 145 and transistor 144 is cut off, to demand no collector current flow through the resistor 146. Therefore, there is no potential drop across the resistor 146, which condition allows the single-ended noise-detector output signal to rise to the 7 v operating potential.

The DC-level shifter 140 supplies the single-ended noise-detector output signal to pulse stretcher circuit 150. The pulse stretcher circuit 150 includes an NPN transistor 151 arranged as a peak detector, with its emitter-follower action rapidly charging a shunt capacitor 152 during rising signals. When the signal supplied to the base of the transistor 151 falls, the shunt capacitor 152 tends to maintain the emitter voltage of the transistor 151 at its previous level and the base-emitter junction of the transistor 151 becomes reverse-biased. Discharge of the shunt capacitor 52 through the resistor 153 is slow by reason of the resistance being appreciably large, which tends to stretch the duration of the pulse stored on the shunt capacitor 152. An NPN transistor 154 in emitter-follower connection applies the stretched pulse for shaping to a voltage comparator comprising a long-tailed pair connection of emitter-coupled NPN transistors 155 and 156 having an NPN transistor 157 demanding a constant collector current from the tail connection of their emitters. The stretched pulse response to a noise pulse appearing across a collector load resistor for the transistor 156 is applied by an NPN emitter-follower transistor to a resistive voltage divider to generate the CONTROL signal applied to determine whether there is to be tracking or holding by a track-and-hold circuit for delayed I VIDEO IN voltage.

In a modification of the noise detector 130 that detects white impulse noise, but not black impulse noise, elements 131 and 133-136 are omitted, together with associated elements used solely for their biasing.

Figure 7:
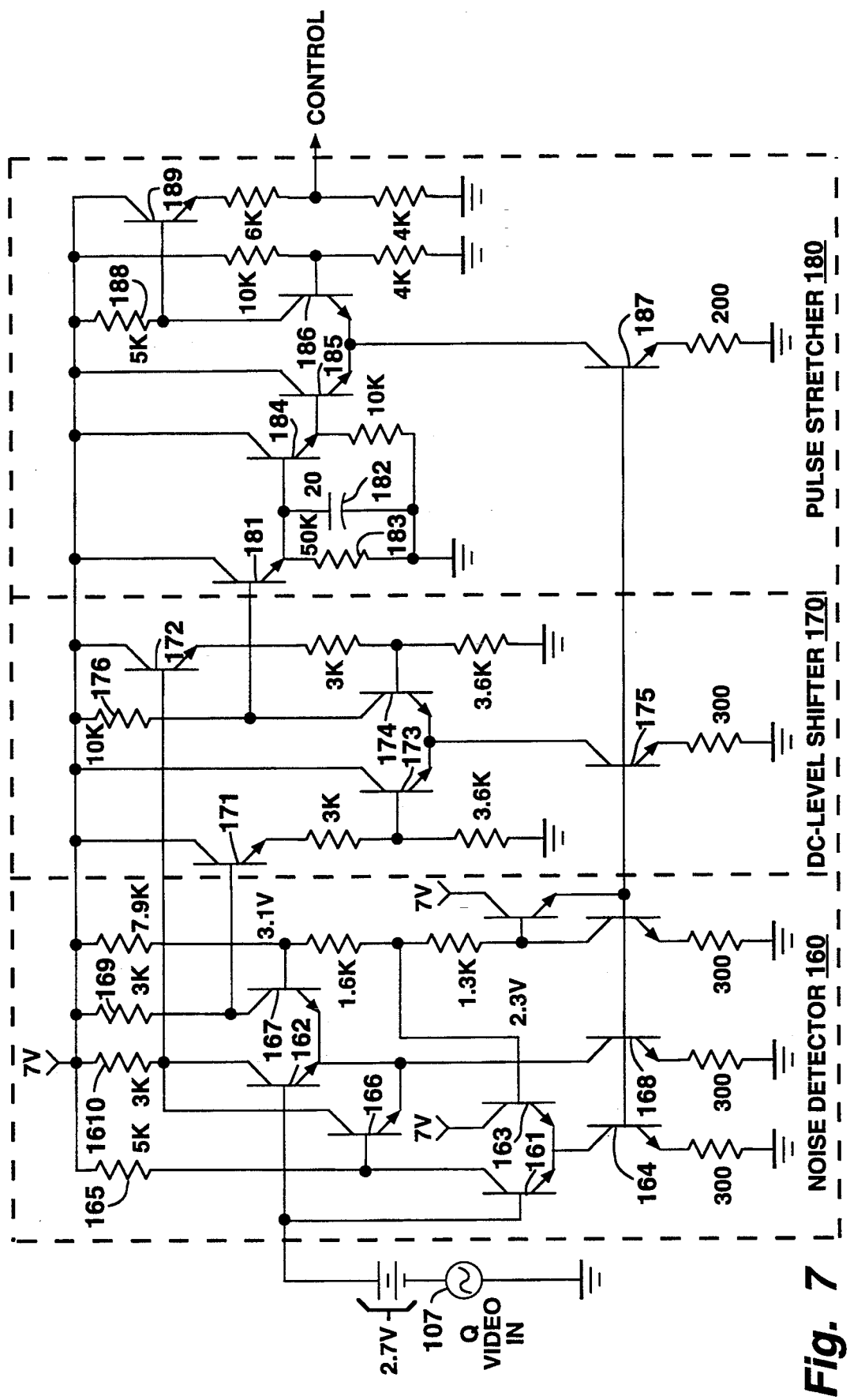
FIG. 7 is a detailed circuit diagram of cascade connection of a noise detector, DC-level shifter and pulse stretcher, as may be used in a noise eliminator circuit connected after a quadrature-phase synchronous video demodulator in accordance with this invention.

FIG. 7 is a detailed circuit diagram of a cascade connection of a noise detector 160, a DC-level shifter 170 and a pulse stretcher 180, as may be used in a noise eliminator circuit that is connected after a quadrature-phase synchronous video demodulator 22 and that further includes a cascade connection of a delay line followed by a track-and-hold circuit per FIG. 5. A quadrature-phase (Q) VIDEO IN signal from a signal source 107 is biased to 2.7 v zero-carrier level (thus to represent in equivalent-circuit form the video demodulator 22) and applied to the base electrodes of NPN transistors 161 and 162 in the noise detector 160. Elements 161-1610 of the noise detector 160 correspond to the elements 131-1310 of the noise detector 130 in structure and substantially correspond in operation. The biasing network used with the elements 161-1610 of the noise detector 160 is somewhat different, however, so that positive-going noise pulses rising above 3.1 volts and negative-going noise pulses falling below 2.3 volts are detected.

The DC-level shifter 170 has the same structure as the DC-level shifter 140, the elements 171-176 corresponding in their operation to the elements 141-146. The pulse stretcher 180 has the same structure as the pulse stretcher 150, the elements 181-189 corresponding in their operation to the elements 151-159.

In a modification of the noise detector 160 that detects positive-going impulse noise, but not negative-going impulse noise, elements 161 and 163-166 are omitted, together with associated elements used solely for their biasing. In a modification of the noise detector 160 that detects negative-going impulse noise, but not positive-going impulse noise, transistor 162 is omitted.

Figure 8:
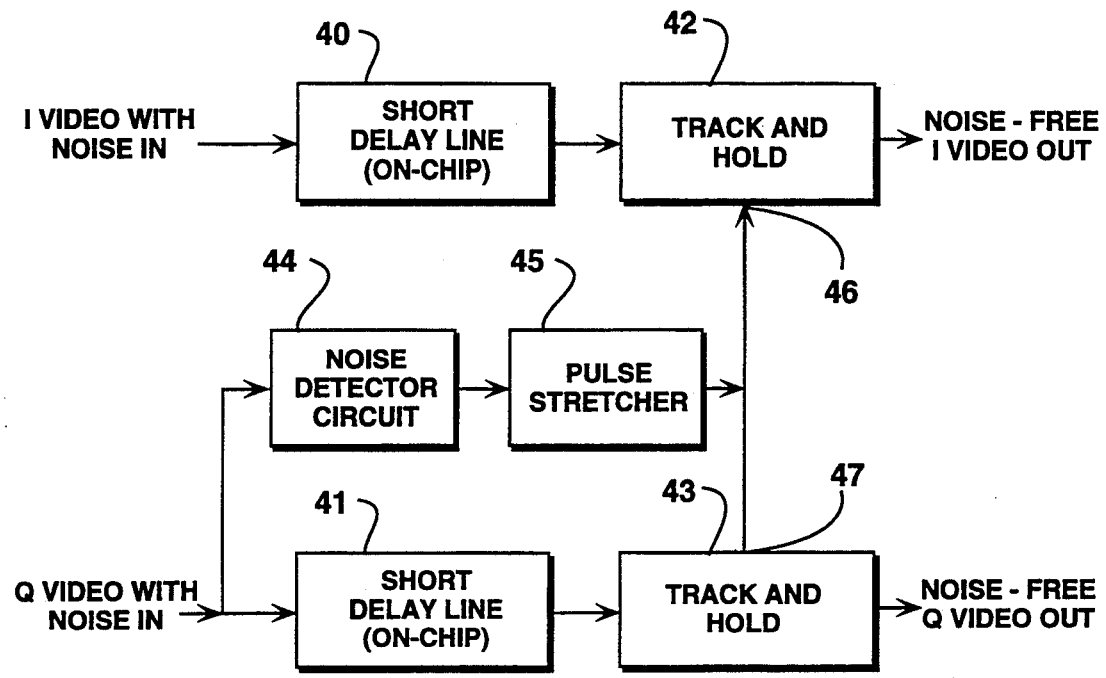
FIG. 8 is a block diagram depicting an alternative embodiment of noise eliminating circuits according to this invention wherein noise elimination from the I video signal and noise elimination from the Q video signals are both controlled responsive to the sensing of impulse noise accompanying the Q video signal as originally detected.

FIG. 8 shows a different embodiment of the impulse noise eliminator modules 25 and 26 of FIG. 1. The output signal from the in-phase (or I) demodulator 21 is applied to the input of a delay line 40 providing a short delay to its output, supplying the input signal of a track-and-hold circuit 42. Similarly, the output signal from the quadrature (or Q) demodulator 22 is applied to the input of a delay line 41 providing a short delay to its output, supplying the input signal of a track-and-hold circuit 43. The video signal with noise from the Q demodulator 22 is applied to the input of an impulse noise detector 44, preferably of a type which will detect positive-going or negative-going impulse noise, such as the type shown in FIG. 7. The output signal of the noise detector 44 is applied to the input of a pulse stretcher circuit 45 which has a stretch time of approximately 800 ns. The output of the pulse stretcher circuit 45 is applied both to the control input 46 of the track-and-hold circuit 42 and to the control input 47 of the track-and-hold circuit 43. Thus, upon an output from the pulse stretcher 45 the track-and-hold circuits 42 and 43 output the previous video levels which were respectively stored therein just prior to the onset of the impulse noise. In this manner, the output of the track-and-hold circuits 42 and 43 are noise-free I and Q video signals respectively.

The Q video signal accompanied by impulse noise, as supplied to the noise detector 44 in the FIG. 8 noise cancellation circuitry, does not have any baseband video component and accordingly has a wider dynamic range for the higher-frequency, lower-level components in the video signal that encode chroma and sound than the I video signal accompanied by impulse noise. The Q video signal accompanied by impulse noise preferably is detected in both positive-going and negative-going directions, as in the FIG. 7 noise detector. Accordingly, the threshold of impulse noise detection can be set very close to the start of the impulse in both amplitude and time in the quadrature channel, thereby to afford more sensitive detection of the occurrence of impulse noise.

Figure 9:
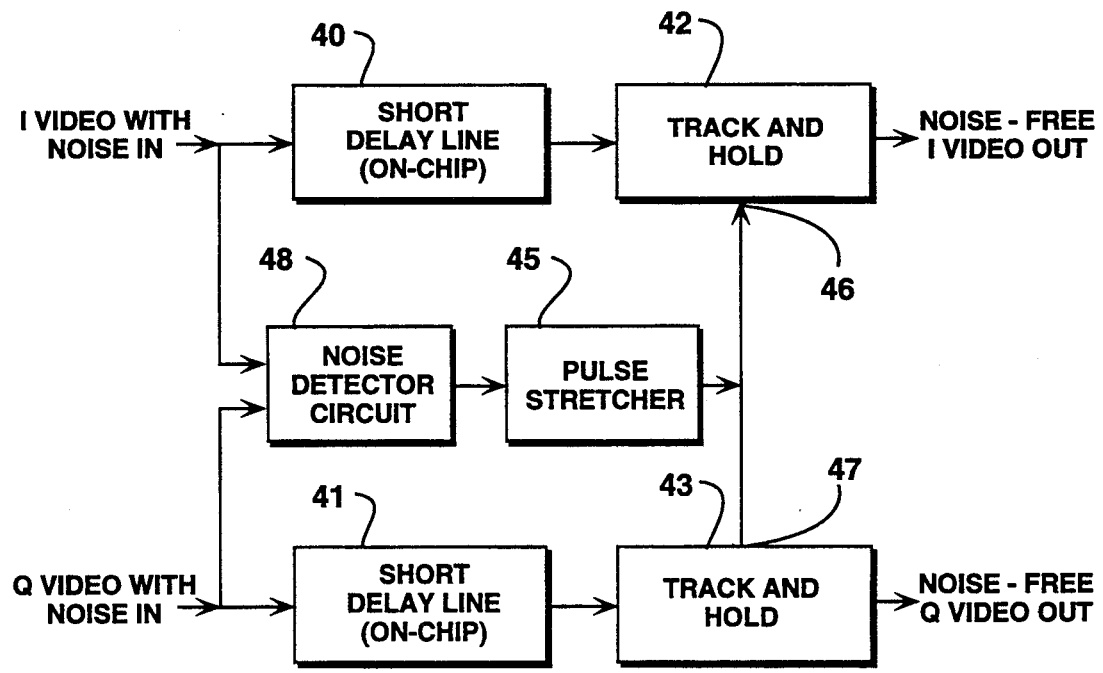
FIG. 9 is a block diagram depicting an alternative embodiment of noise eliminating circuits according to this invention, wherein noise elimination from the I video signal and noise elimination from the Q video signals are both controlled responsive both to the sensing of impulse noise accompanying the Q video signal as originally detected and to the sensing of white-going impulse noise accompanying the I video signal as originally detected.

FIG. 9 shows a still different embodiment of the impulse noise eliminator modules 25 and 26 of FIG. 1, which differs from the embodiment shown in FIG. 8 in that the noise detector 44 is replaced by a noise detector 48. The noise detector 48 is of a type that will detect positive-going or negative-going impulse noise accompanying the video signal from the Q demodulator 22 and will detect at least the white impulse noise accompanying the video signal from the I demodulator 21.

Figure 10:
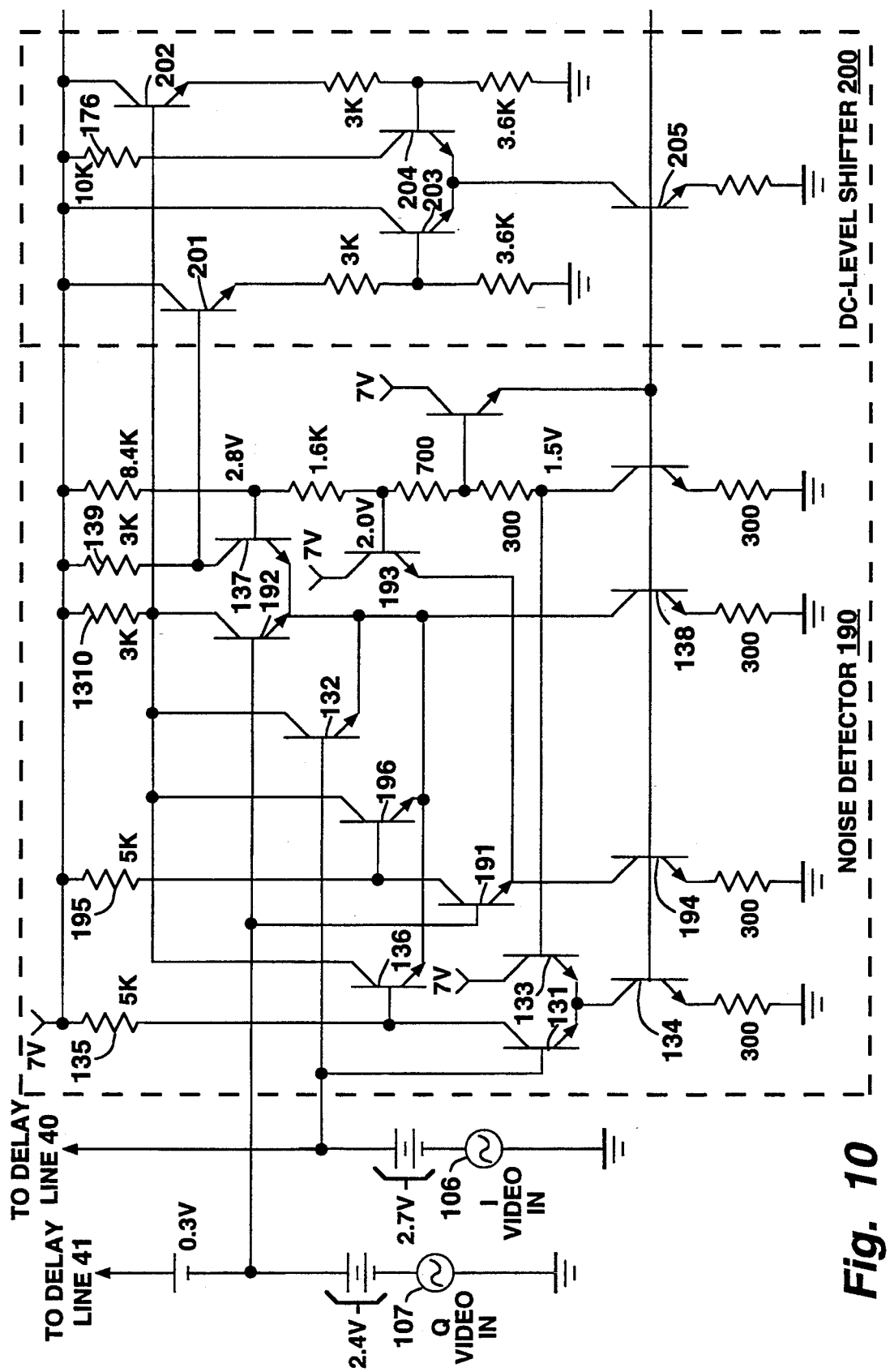
FIG. 10 is a detailed circuit diagram of a noise detector and succeeding DC-level, shifter that can be used for implementing the FIG. 9 noise eliminating circuits.

FIG. 10 is a detailed circuit diagram of a noise detector 190 and succeeding DC-level shifter 200 as may be used to implement the FIG. 9 noise eliminator circuitry. The DC-level shifter 200 has the same structure as the DC-level shifter 140 or 170, the elements 201-206 corresponding in their operation to the elements 141-146 or 171-176.

An in-phase (I) VIDEO IN signal from a signal source 106 is biased to 2.7 v zero-carrier level (thus to represent in equivalent-circuit form the video demodulator 21). This signal is then applied to the base electrodes of NPN transistors 131 and 132 in the noise detector 190 as well as to the 240 ns delay line 40 with the track-and-hold circuit 42 cascaded thereafter. The noise detector 190 includes elements 131-1310 that function substantially the same as the correspondingly numbered elements in the noise detector 130 of FIG. 6 to detect white impulse noise that swings more positive than 2.8 v and black impulse noise that swings less positive than 1.5 v.

A quadrature-phase (Q) VIDEO IN signal from a signal source 107 is biased to 2.4 v zero-carrier level to be applied to the base electrodes of NPN transistors 191 and 192 in the noise detector 190 and thence an additional 0.3 v to be applied to the 240 ns delay line 41 and the track-and-hold circuit 43 cascaded thereafter. (If the Q VIDEO IN signal from a signal source 107 and biased to 2.7 v zero-carrier level is considered to represent in equivalent-circuit form the video demodulator 22, then the Q VIDEO IN signal from a signal source 107 and biased to 2.4 v zero-carrier level can be considered to represent a voltage translated downward in potential therefrom.)

Transistor 192 is connected to OR with the transistor 132 so as to detect positive-going impulse noise above 2.8 v in the Q VIDEO IN signal as biased to 2.4 v zero-carrier level. This corresponds to detecting positive-going impulse noise above 3.1 v in the Q VIDEO IN signal as biased to 2.7 v zero-carrier level. So the noise detector 190 of FIG. 10 duplicates the positive-going impulse noise detection property of the noise detector 160 of FIG. 7.

The transistor 191 conducts to selectively cause a potential drop across a collector lead resistor 195 thereof as long as the Q VIDEO IN signal as biased to 2.4 v zero-carrier level is above 2.0 v. When a negative-going impulse noise falling below 2.0 v in the Q VIDEO IN signal as biased to 2.4 v zero-carrier level occurs, an NPN transistor 193 takes over the conduction of the constant collector current demand of an NPN transistor 194. The transistor 191 is cut off, so there is no longer a substantial potential drop across its collector lead resistor 195 and the base potential of an NPN transistor 196 is subsequently raised. The transistor 196 appropriates the collector current of the transistor 138 to itself as its emitter current, causing a collector demand of its own that causes a potential drop across the resistor 1310, and cutting off the transistor 137 so it no longer supplies collector current to maintain a voltage drop across the resistor 139. Thus, negative-going impulse noise falling below 2.0 v in the Q VIDEO IN signal as biased to 2.4 v zero-carrier level is also detected by the noise detector 190. This corresponds to detecting negative-going impulse noise falling below 2.3 v in the Q VIDEO IN signal as biased to 2.7 v zero-carrier level. So the noise detector 190 of FIG. 10 duplicates the negative-going impulse noise detection property of the noise detector 160 of FIG. 7.

One skilled in the art Will through acquaintance with the foregoing disclosure be enabled to employ alternative circuit configurations to implement the structure, as well as to employ additional components for carrying out the purposes of the invention. For example, track and hold circuits may be used for the color-difference signals C1 and C2 to avoid chroma drop-out during impulse noise. One skilled in the art will through acquaintance with the foregoing disclosure be enabled to employ the noise elimination technique described above in other types of television receivers which do not employ synchronous demodulation or in types of television receivers that employ quasi-synchronous detectors of the type which performs product detection by extracting the IF carrier component from an IF signal with a passive filter. The scope of protection afforded by the claims which follow should be construed taking into consideration the breadth of such teaching.

What is claimed is:

1. In a television system including a source of an intermediate frequency (IF) signal comprising an IF picture carrier amplitude-modulated with video information; a video detector for detecting said video information, which video information is apt to be accompanied at times by detected impulse noise to result in its being outside a prescribed range for normal video information; and processing circuitry for providing an output video signal in response to said video information as detected by said video detector, in which output video signal response to said detected impulse noise is suppressed, said processing circuitry comprising:

noise detecting means for generating an output control signal responsive to said video information as detected by said video detector being outside said prescribed range for normal video information, said output control signal being indicative of whether or not an appreciable amount of said detected impulse noise accompanies said video information as detected by said video detector;

delay means for generating a delayed response to said video information as detected by said video detector; and video output means controlled by said output control signal, for responding to the current value of said delayed response to said video information as detected by said video detector when said output control signal indicates there is not an appreciable amount of said detected impulse noise accompanying said video information as detected by said video detector, and for substituting for said current value of said delayed response to said video information as detected by said video detector a constant value of video signal when said output control signal indicates there is an appreciable amount of said detected impulse noise accompanying said video information as detected by said video detector.

2. In a television system including a source of an intermediate frequency (IF) signal comprising an IF picture carrier amplitude-modulated with video information; a video detector for detecting said video information, which video information is apt to be accompanied at times by detected impulse noise to result in its being outside a prescribed range for normal video information; and processing circuitry for providing an output video signal in response to said video information as detected by said video detector, in which output video signal response to said detected impulse noise is suppressed, said processing circuitry comprising:

noise detecting means for generating an output control signal responsive to said video information as detected by said video detector being outside said prescribed range for normal video information, said output control signal being indicative of whether or not an appreciable amount of said detected impulse noise accompanies said video information as detected by said video detector;

delay means for generating a delayed response to said video information as detected by said video detector;

video output means controlled by said output control signal, for responding to the current value of said delayed response to said Video information as detected by said video detector when said output control signal indicates there is not an appreciable amount of said detected impulse noise accompanying said video information as detected by said video detector, and for substituting for said current value of said delayed response to said video information as detected by said video detector a constant value of video signal when said output control signal indicates there is an appreciable amount of said detected impulse noise accompanying said video information as detected by said video detector;

means for temporarily storing said video information as detected by said video detector; and means for determining, from the temporarily stored said video information as detected by said video detector, the constant value of video signal for substituting for said current value of said delayed response to said video information as detected by said video detector.

3. The television system according to claim 2 wherein said source of an intermediate frequency (IF) signal is of a type tending to respond to impulse noise with ringing at a natural frequency that is detected as midband video frequency response by said video detector; and wherein said delay line provides a delay of about half a cycle of said midband video frequency to the video information as detected by said video detector.

4. The television system according to claim 3 wherein said video output means includes:

pulse stretching means having an input connection to which the output control signal from said noise detecting means is supplied and having an output connection from which a stretched pulse response to said output control signal is supplied, the stretched pulse response having a given amount of stretch time longer than one cycle of said natural frequency; and a track-and-hold circuit having an input for receiving from said output of said delay line said delayed response to said video information as detected by said video detector, a control terminal for receiving said stretched pulse response from said output connection of said pulse stretching means, and an output for supplying the current value of said delayed response when said stretched pulse response is to an output control signal that indicates there is not an appreciable amount of said detected impulse noise accompanying said video information as detected by said video detector and for supplying a held value of said delayed response when said stretched pulse response is to an output control signal that indicates there is an appreciable amount of said detected impulse noise accompanying said video information as detected by said video detector.

5. The television system according to claim 4 wherein said given amount of stretch time is between 600 and 800 nanoseconds.

6. In a television system including a source of an intermediate frequency (IF) signal comprising an IF picture carrier amplitude-modulated with video information; a video detector for detecting said video information which video information is apt to be accompanied at times by detected impulse noise to result in its being outside a prescribed range for normal video information; and processing circuitry for providing an output video signal in response to said video information as detected by said video detector, in which output video signal response to said detected impulse noise is suppressed, said processing circuitry comprising:

noise detecting means for generating an output control signal responsive to said video information as detected by said video detector being outside said prescribed range for normal video information, said output control signal being indicative of whether or not an appreciable amount of said detected impulse noise accompanies said video information as detected by said video detector;

delay means for generating a delayed response to said video information as detected by said video detector; and video output means controlled by said output control signal, for responding to the current value of said delayed response to said video information as detected by said video detector when said output control signal indicates there is not an appreciable amount of said detected impulse noise accompanying said video information as detected by said video detector, and for substituting for said current value of said delayed response to said video information as detected by said video detector a constant value of video signal when said output control signal indicates there is an appreciable amount of said detected impulse noise accompanying said video information as detected by said video detector, wherein said video output means includes:

a track-and-hold circuit having an input for receiving from said output of said delay line said delayed response to said video information as detected by said video detector, a control terminal for receiving said control signal from said output connection of said noise detecting means, and an output for supplying the current value of said delayed response when said output control signal indicates there is not an appreciable amount of said detected impulse noise accompanying said video information as detected by said video detector and for supplying a held value of said delayed response when said output control signal indicates there is an appreciable amount of said detected impulse noise accompanying said video information as detected by said video detector.

7. The television system according to claim 6 wherein said source of an intermediate frequency (IF) signal is of a type tending to respond to impulse noise with ringing at a natural frequency that is detected as midband video frequency response by said video detector; and wherein said delay line provides a delay of about half a cycle of said midband video frequency to the video information as detected by said video detector.

8. In a television system including a source of an intermediate frequency (IF) signal comprising an IF picture carrier amplitude-modulated with video information; a video detector that detects both luminance and chrominance components of said video information as a composite video signal, which video information is ant to be accompanied at times by undesirable detected impulse noise to result in its being outside a prescribed range for normal video information; and processing circuitry for providing an output video signal in response to said video information as detected by said video detector, in which output video signal response to said detected impulse noise is suppressed, said processing circuitry comprising:

noise detecting means for generating an output control signal responsive to said video information as detected by said video detector being outside said prescribed range for normal video information, said noise detecting means being of a type for responding to said detected impulse noise that is white-going respective to said luminance component of said video information, and said output control signal being indicative of whether or not said video information as detected by said video detector is accompanied by an appreciable amount of said detected impulse noise that is white-going respective to said luminance component of said video information;

delay means for generating a delayed response to said video information as detected by said video detector; and video output means controlled by said output control signal, for responding to the current value of said delayed response to said video information as detected by said video detector when said output control signal indicates there is not an appreciable amount of said detected impulse noise accompanying said video information as detected by said video detector, and for substituting for said current value of said delayed response to said video information as detected by said video detector a constant value of video signal when said output control signal indicates there is an appreciable amount of said detected impulse noise accompanying said video information as detected by said video detector.

9. In a television system including a source of an intermediate frequency (IF) signal including an IF picture carrier amplitude modulated with video information, a combination of apparatus for reducing the effects of impulse noise in said video signal, comprising:

synchronous demodulator means responsive to said IF signal for providing a first in-phase output video signal and a second quadrature-phase output video signal;

delay means responsive to one of said video signals for providing at an output a delayed video signal;

noise detector means responsive to one of said video signals for generating an output pulse upon detection of noise in said signal;

track-and-hold means having an input to which said output of said delay means is coupled and having a control terminal responsive to said noise output pulse to normally provide said delayed video signal at an output and to selectively provide a previous video level at said output during the presence of said output pulse from said noise detector means.

10. The television system according to claim 9 further including:

pulse stretching means having an input to which the output of said noise detector means couples and having an output from which a stretched pulse is supplied to said control terminal of said track-and-hold means responsive to each said output pulse from said noise detector means.

11. The television system according to claim 10 wherein said delay means is a delay line providing a delay of about 240 nanoseconds and wherein said pulse stretching means provides a stretch time between 600 and 800 nanoseconds.

12. The television system according to claim 9 wherein said one video signal which said delay means is responsive to is said first in-phase output video signal.

13. The television system according to claim 12 further including means for applying said second quadrature-phase output video signal to said noise detector means.

14. The television system according to claim 9 wherein said one video signal which said delay means is responsive to is said second quadrature-phase output signal.

15. The television system according to claim 14 including chroma circuitry responsive to signal from the output of said track-and-hold means for generating first and second color-difference signals.

16. The television system according to claim 9 including chroma circuitry responsive to signal from the output of said track-and-hold means for generating first and second color-difference signals.

17. A method of reducing impulse noise in a television system, said system providing an IF amplitude-modulated picture carrier signal, comprising the steps of:

synchronously demodulating said IF amplitude-modulated picture carrier signal to provide a first in-phase video signal and a second quadrature-phase video signal;

detecting noise pulses on at least one or the other of said first and second video signals to provide a control signal only during the presence of noise pulses;

delaying one of said first and second video signals a given amount to generate a delayed signal;

temporarily storing previous values of said delayed signal;

during the absence of said control signal, outputting a current value of said delayed signal; and during the presence, of said control signal, substituting for said current value of said delayed signal a previous value of said delayed signal.

18. The method according to claim 17 further including the step of stretching said control signal a given amount sufficient to encompass the interval of said video signal containing noise.

19. The method according to claim 18 wherein the step of stretching includes stretching said pulse for an interval between 600 and 800 nanoseconds.

20. The method according to claim 17 wherein said step of delaying said one video signal a given amount includes delaying said one video signal for about 240 nanoseconds.

21. The method according to claim 17 wherein said step of delaying said one video signal a given amount consists of the step of delaying said first in-phase video signal and wherein said step of detecting noise pulses on at least one or the other of said first and second video signals consists of detecting noise pulses on said second quadrature-phase video signal.

* * * * *